United States Patent
Lee et al.

(10) Patent No.: US 8,253,008 B2
(45) Date of Patent: Aug. 28, 2012

(54) AMTEC WITH HEAT PIPE

(75) Inventors: Ki-Woo Lee, Daejeon (KR); Won-Pyo Chun, Daejeon (KR)

(73) Assignee: Korea Institute of Energy Research, Daejeon (KR)

(*) Notice: Subject to any disclaimer, the term of this patent is extended or adjusted under 35 U.S.C. 154(b) by 977 days.

(21) Appl. No.: 12/284,718

(22) Filed: Sep. 24, 2008

(65) Prior Publication Data
US 2011/0168222 A1    Jul. 14, 2011

(30) Foreign Application Priority Data

Jul. 25, 2008 (KR) .................. 10-2008-0072854

(51) Int. Cl.
*H01L 35/30* (2006.01)
*H01L 35/00* (2006.01)
*H01L 35/28* (2006.01)
*H01M 6/36* (2006.01)
*H01M 2/38* (2006.01)
*H01M 4/36* (2006.01)
*H01M 10/50* (2006.01)

(52) U.S. Cl. ........ 136/205; 136/200; 136/208; 136/209; 429/11; 429/51; 429/104; 429/112; 429/120

(58) Field of Classification Search .................. 136/205, 136/200, 208, 209; 429/11, 51, 104, 112, 429/120
See application file for complete search history.

(56) References Cited

U.S. PATENT DOCUMENTS

| | | | | |
|---|---|---|---|---|
| 3,404,035 A | * | 10/1968 | Weber et al. | 429/50 |
| 3,404,036 A | * | 10/1968 | Weber et al. | 429/442 |
| 3,458,356 A | * | 7/1969 | Weber et al. | 429/11 |
| 3,615,871 A | * | 10/1971 | Merges et al. | 136/205 |
| 4,042,757 A | * | 8/1977 | Jones | 429/104 |
| 5,228,922 A | * | 7/1993 | Sievers | 136/202 |
| 5,928,436 A | * | 7/1999 | Borkowski et al. | 136/205 |
| 6,239,350 B1 | * | 5/2001 | Sievers et al. | 136/205 |
| 6,820,684 B1 | * | 11/2004 | Chu et al. | 165/104.33 |
| 2007/0017565 A1 | | 1/2007 | Nakagiri et al. | |
| 2008/0247897 A1 | | 10/2008 | Guthrie | |

* cited by examiner

*Primary Examiner* — Jennifer Michener
*Assistant Examiner* — Marla D McConnell
(74) *Attorney, Agent, or Firm* — Rabin & Berdo, PC

(57) ABSTRACT

There is provided an AMTEC (alkali metal thermal-electric converter) with a heat pipe and more particularly, to an AMTEC with a heat pipe minimized a heating part and a condensation part of the AMTEC and improved in efficiency of thermal to electric conversion through installing the heating and cooling heat pipes in the AMTEC, in which a metal fluid is heated by latent heat of an operating fluid of the heat pipe, instead of the heat conduction from a heat source, thereby reducing a temperature difference needed for heat transfer to vaporize the metal fluid even by a heat source of a lower temperature than a conventional heat source; improving a cooling performance in a condensation part to result in the high efficiency of thermal to electric conversion; using no additional driving components for driving the heat pipe.

4 Claims, 8 Drawing Sheets

AMTEC WITH HEAT PIPE

CROSS-REFERENCE TO RELATED PATENT APPLICATION

This application claims the benefit of Korean Patent Application No. 10-2008-0072854, filed on Jul. 25, 2008, in the Korean Intellectual Property Office, the disclosure of which is incorporated herein in its entirety by reference.

BACKGROUND OF THE INVENTION

1. Field of the Invention

The present invention relates to an AMTEC (alkali metal thermal-electric converter) with a heat pipe and more particularly, to an AMTEC with a heat pipe minimized a heating part and a condensation part of the AMTEC, and improved in efficiency of thermal to electric conversion through installing the heating and cooling heat pipes as a heating device and a condensing device in the AMTEC, in which a metal fluid is heated by a latent heat of an operating fluid of the heat pipe, instead of heat conduction from a heat source, thereby reducing a temperature difference needed for heat transfer to increase a vapor generation of the metal fluid by the heat source of a lower temperature than a conventional heat source; improving a cooling performance in a condensation part to result in a high efficiency of thermal to electric conversion; and using no additional driving components for driving the heat pipe.

2. Description of the Related Art

An AMTEC (alkali metal thermal-electric converter) is a device having a characteristic of directly converting thermal energy to electrical energy. In the AMTEC, when a temperature difference $\Delta T$ is applied to both ends of a BASE (beta-alumina solid electrolyte) having ion conductivity, a difference in vapor pressure of liquid Na filling the inside of a cell acts as a driving force to move $Na^+$ ions through a space among loosely bonded lattice oxygen. The $Na^+$ ions passing through the electrolyte are neutralized on the surface of an electrode during a condensing process, to generate electricity. Then, the electricity of a low voltage and a high current is output. High capacity generation is enabled by modulating and collecting the low voltage and high current electricity.

The principle of the AMTEC technology is that, when alkali metal sodium is vaporized in a vaporizer of a high pressure region by a heat source, sodium ions pass through the BASE and free electrons pass through electrical load from positive pole and return to negative pole to re-combine with the ions coming from the surface of the BASE of a low pressure region, thereby generating electricity. The neutral sodium vapor is condensed by cooling of a low temperature fluid in inner surface of a condenser of a low pressure region, and the condensed liquid returns to the vaporizer by a condenser wick to complete a cycle. The typical temperatures of the vaporizer and condenser of the metal fluid are respectively 900~1100K and 500~650K. The vaporization and condensation of sodium in these temperature conditions enables the efficiency of generating electricity by the thermal to electric conversion up to 40%.

A semiconductor thermoelectric generation system has been used as a power source for space application but there are drawbacks of low efficiency and heavy weight in such a generation system. The AMTEC technology is developed to substitute the thermoelectric generation system using a thermoelectric module. The characteristics of the AMTEC technology are to have high power density, high efficiency and low cost per unit area and to maintain stability during use. The AMTEC technology has the high a higher conversion efficiency compared to any other direct thermo-electric converters and directly converts heat energy to electric energy using various heat sources, such as fossil fuel, solar energy, radioactive isotopes, nuclear reactors or the like, as its fuel.

Unlike the conventional electricity generation technology, the AMTEC technology is the high efficiency technology relating to the thermal to electric converter, using the heat sources, such as not only the heat of combustion of gas but also waste heat, solar heat, heat of the earth, radioactive isotopes or the like, without a driving part, such as a turbine or boiler. Therefore, the AMTEC technology is considered as the new future-oriented technology of electricity generation, which is capable of producing high capacity electricity of several hundred MWs. Specifically, since the power density per mass is about 2~3 times that of a solar power generator or Stirling engine, the AMTEC technology can be widely used for space application, military application, and power technology using high temperature waste heat. Further, since the AMTEC technology uses the condenser wick for circulation of a liquid metal, mechanical elements are not needed, to increase a stability of the converter.

Since the AMTEC technology has the high capacity of MWs in high efficiency, it may be used for the thermo-electric converter. Further, when the AMTEC technology is used for the cogeneration (combined heat and power), it is capable of improving the utilization of energy by 70% or more. Therefore, the research and development of the AMTEC technology are needed to generate power with no noise, to increase the effective utilization of energy, and to reduce the peak load.

The aforementioned AMTEC comprises: sodium as a metal fluid, a BASE (beta alumina solid electrolyte) for separating a system into a high pressure region and a low pressure region and allowing only sodium ions to pass to generate electricity, a condenser for condensing and absorbing sodium vapor, a condenser circulation wick for circulating liquid sodium, a vaporizer for converting sodium transferred from the condenser circulation wick in the liquid state into the vapor state, and a heater for heating sodium as a heat source.

The AMTEC receives heat from the heat source outside and transfers the heat to the vaporizer inside. In the conventional AMTEC, since heat is supplied to the inside of the vaporizer by conduction, a temperature difference needs to be high and thus, the temperature of the heat source needs to be high. Further, since the conventional condenser releases heat by conduction, there is a problem in that the AMTEC is large in size. Consequently, the efficiency of generating electricity by the thermal to electric conversion decreases.

Moreover, in the AMTEC, since heat supply to vaporize the metal fluid is performed by conduction, a temperature difference needs to be high and thus the temperature of the heat source needs to be high. Further, since the condenser for condensing the metal fluid vapor operates by conduction, there is a problem in that the heat conduction area increases.

SUMMARY OF THE INVENTION

The present invention provides an AMTEC which is installed with a heat pipe as an heater and/or a condenser, in which a vaporizing of a metal fluid is accomplished even though a difference between a temperature of heat source and a temperature needed for vaporizing the metal fluid is small, and a condensing of the metal fluid vapor is possible even though a difference between a temperature of the metal fluid vapor and a temperature needed for condensing the metal fluid vapor is small so that the AMTEC becomes small in size and the efficiency of thermal to electric conversion is improved through using the heat pipe for vaporization of the metal fluid and for condensing of the metal fluid vapor.

The present invention also provides an AMTEC which is installed with a heat pipe as a heater in which heat is directly transferred to a vaporizer of the AMTEC by using a latent heat of an operating fluid of the heat pipe, so that a metal fluid is vaporized at a heat source of a low temperature and therefore the thermal efficiency is improved through installing the heat pipe as a heater.

According to an aspect of the present invention, there is provided an AMTEC with a heat pipe, which converts heat energy to electric energy, comprising: a case which inside is closed and filled with a predetermined amount of a metal fluid; a heating heat pipe formed at a lower end of the case so as to be operatively connected with the case, for heating the metal fluid filling the inside of the case and vaporizing the metal fluid into vapor; a condenser circulation wick installed above the heating heat pipe protruded inside the case, for collecting the metal fluid vapor vaporized by the heating heat pipe and guiding the vapor of the metal fluid in one direction; a number of BASE (beta alumina solid electrolyte) tubes installed radially around the center of the case, for allowing the high-temperature the metal fluid vapor guided by the condenser circulation wick to pass and generate electricity; and a condenser formed at a top of the case inside, for collecting and condensing the metal fluid vapor which temperature becomes low to a predetermined temperature during passing through the BASE tubes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As used herein, the singular forms "a", "an" and "the" are intended to include the plural forms as well, unless the context clearly indicates otherwise.

The present invention may be embodied in different forms and should not be construed as limited to the embodiments set forth herein. Rather, these embodiments are provided as teaching examples of the invention. Therefore, it will be understood that the scope of the invention is intended to include various modifications and alternative arrangements within the capabilities of persons skilled in the art using presently known or future technologies and equivalents.

Figure 1:
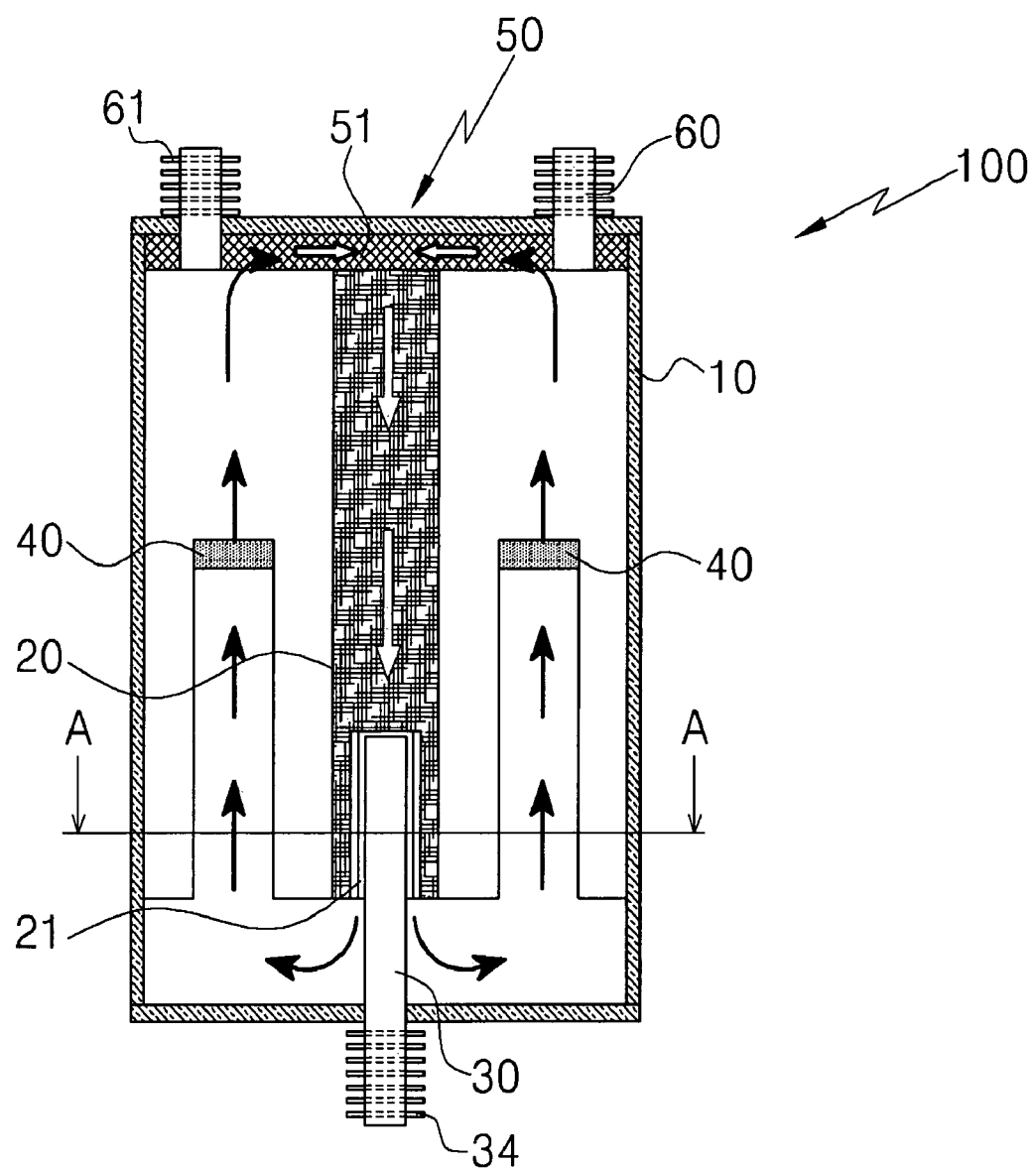
FIG. 1 is a sectional view of an AMTEC according to a first embodiment of the present invention.
Figure 2:
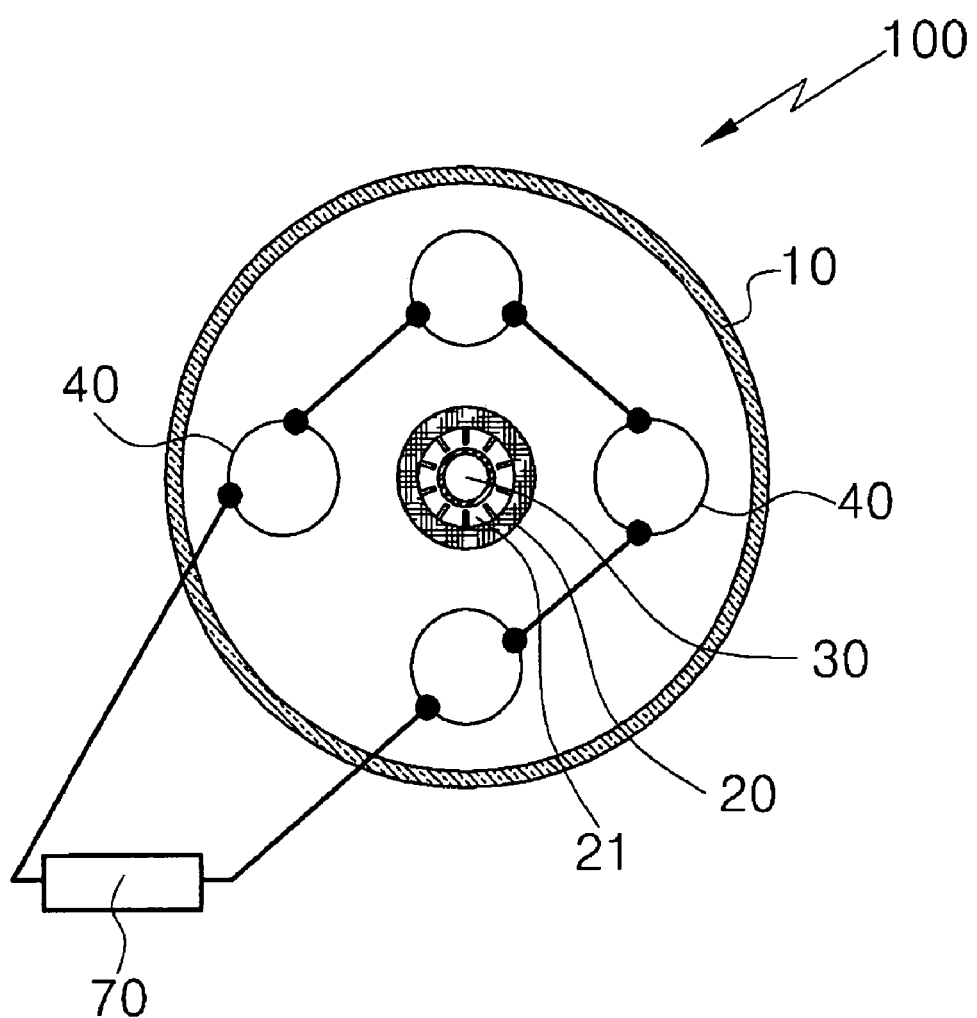
FIG. 2 is a sectional view taken along line A-A of FIG. 1.
Figure 3:
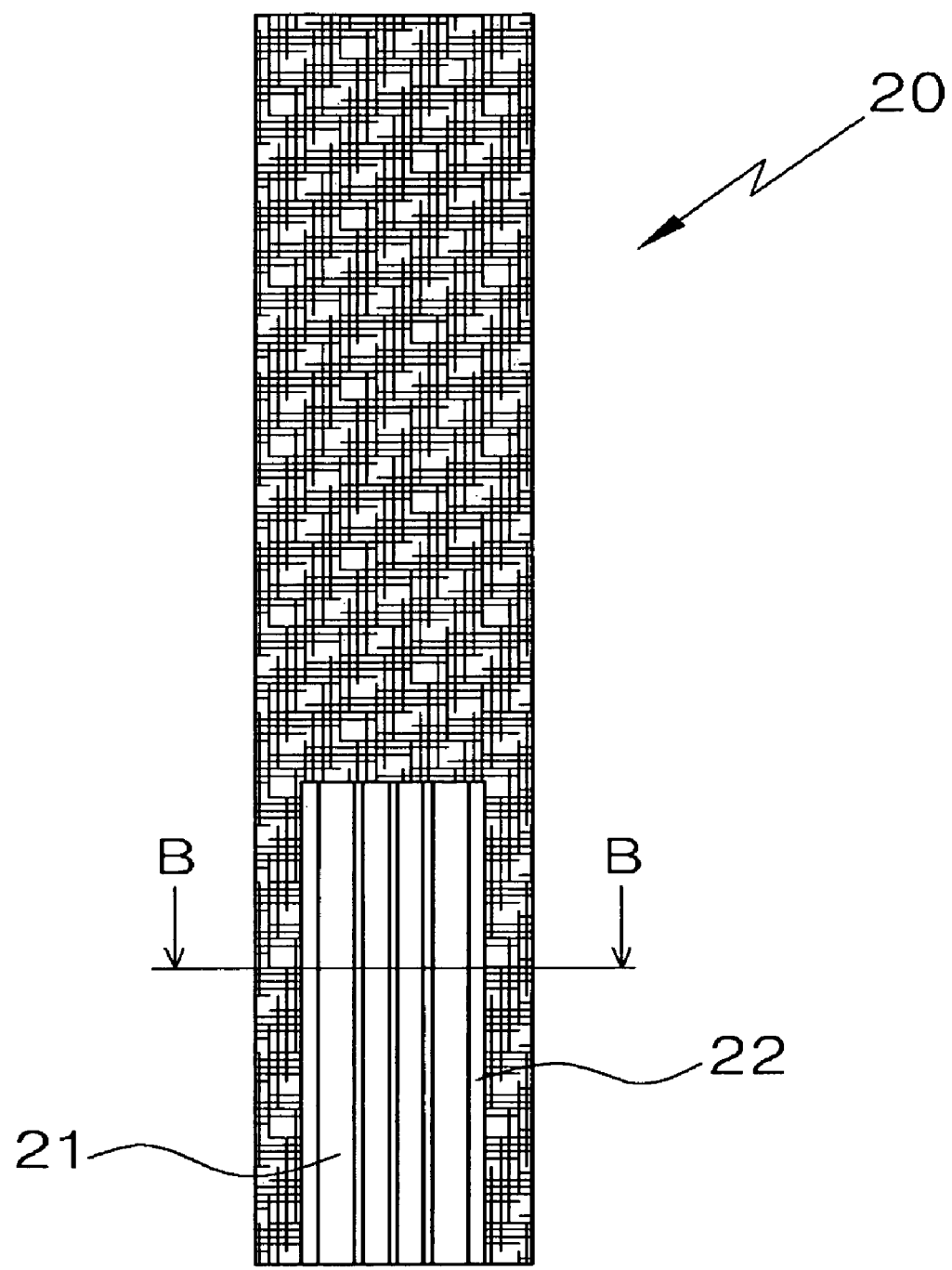
FIG. 3 is a sectional view of a condenser circulation wick according to the first embodiment.
Figure 4:
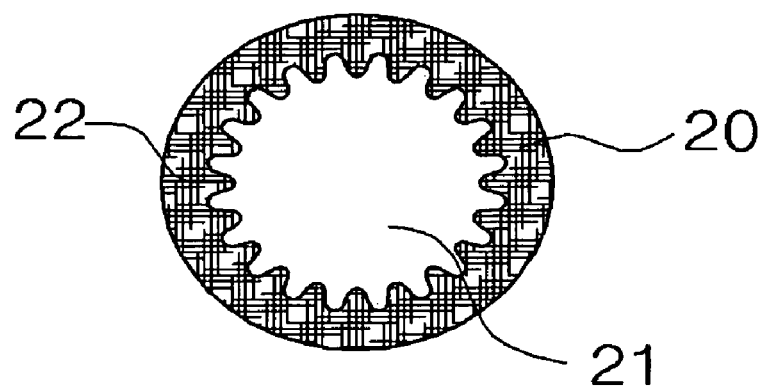
FIG. 4 is a sectional view taken along line B-B of FIG. 3.
Figure 4:
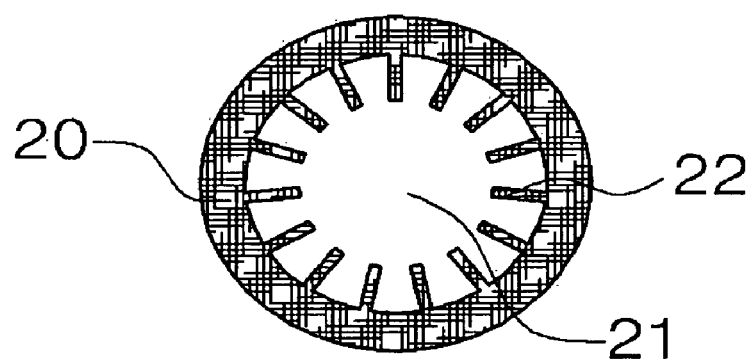
Figure 4:
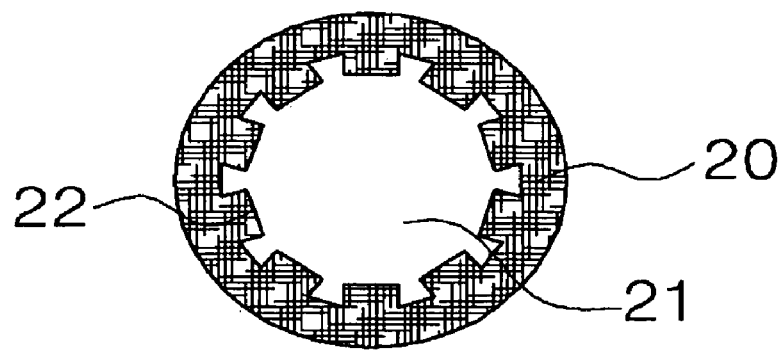

FIG. 1 is a sectional view of an AMTEC according to a first embodiment of the present invention, FIG. 2 is a sectional view taken along line A-A of FIG. 1, FIG. 3 is a sectional view of a condenser circulation wick according to the first embodiment of the present invention, and FIG. 4 is a sectional view taken along line B-B of FIG. 3.

As illustrated in FIGS. 1 and 2, the AMTEC with a heat pipe according to the first embodiment of the present invention comprises: a case 10, a condenser circulation wick 20, a heating heat pipe 30, a condenser 50, a BASE tube 40, and a condensing heat pipe 60.

The case 10 has a completely closed inside to be filled with a predetermined amount of a metal fluid. As the metal fluid, alkali metal sodium is used in the AMTEC. Sodium metal fluid is vaporized into sodium vapor by a heat source and the sodium vapor generates electricity while passing through the BASE tube 40. The principle that the sodium vapor (hereinafter, referred to as the "metal fluid vapor") generates electricity while passing through the BASE tube 40 will be described below:

After including the condenser circulation wick 20, the condenser 50 and the BASE tube 40 inside the case 10, the case 10 is sealed. Only parts of the heating heat pipe 30 and condensing heat pipe 60 are protruded outwardly.

The condenser circulation wick 20 is formed at a center part of the case 10 and is connected to the condenser 50. One end of the heating heat pipe 30 is formed to protrude inside the condenser circulation wick 20. When the metal fluid filling the inside of the case 10 is heated by the heat source of the heating heat pipe 30 and is vaporized, the condenser circulation wick 20 collects the vapor to be guided in one direction (toward the direction of the BASE tube).

An insertion opening 21 to position the heating heat pipe 30 is formed inside the condenser circulation wick 20. The other space inside the condenser circulation wick 20 is filled with a condenser wick. Referring to FIG. 3, in the insertion opening 21 of the condenser circulation wick 20, a number of groove wicks 22 are formed to guide the metal fluid vapor vaporized by the heating heat pipe 30 in one direction. Further, each groove wick 22 is formed to be extended long in a length direction of the insertion opening 21 and a number of groove wicks 22 are arranged along a circumferential direction of the insertion opening 21.

Referring to FIG. 4, the groove wicks 22 may have a sectional view of the groove wicks 22 selected among various shapes, such as a square shape, a round shape and a triangle shape.

The heating heat pipe 30 comprises: a vaporization part 31 where an operating fluid filled inside is being vaporized by heat applied from outside, a transfer part 32 where the operating fluid vapor vaporized in the vaporization part is being transferred, and a condensation part 33 where the operating fluid vapor transferred through the transfer part 32 is being condensed by transferring heat to the outside. The inside of the heating heat pipe 30 is closed, the condensation part 33 of the heating heat pipe 30 is positioned inside the condenser circulation wick 20 installed inside the case 10, and the vaporization part 31 is positioned outside the case 10.

In the vaporization part 31, the operating fluid filled inside the heating heat pipe 30 is vaporized by heat applied from outside. A number of pins 34 are formed passing through the vaporization part 31 so that heat from outside is rapidly and smoothly transferred to the inside of the heating heat pipe 30. Each pin 34 is formed to be perpendicular to the heating heat pipe 30 so that the inside of the vaporization part 31 is connected to the outside. Here, the pins 34 are attached to the vaporization part 31 of the heating heat pipe 30 by welding or other methods.

In the vaporization part 31 of the heating heat pipe 30, the operating fluid inside the heating heat pipe 30 is vaporized by the heat source, the operating fluid vapor rises to the condensation part 33 inserted into a lower part of the condenser circulation wick 20, and heats the metal fluid in the lower part of the condenser circulation wick 20 to vaporize the metal fluid.

The transfer part 31 is integrally formed with the vaporization part 31 and guides the operating fluid vapor vaporized in the vaporization part 31 so as to be transferred to the condensation part 33.

The condensation part 33 is integrally formed with the transfer part 32 and condenses the operating fluid vapor guided through the transfer part 32 back into the operating fluid by transferring heat to outside.

The BASE tube 40 means the beta alumina solid electrolyte tube and will be called "BASE" in the present invention.

A number of the BASE tubes 40 are formed radially around the condenser circulation wick 20. While the metal fluid vapor guided by the condenser circulation wick 20 passes through the inside of each BASE tube 40, electricity is generated from the BASE tubes 40 and heat energy is converted into electric energy in the BASE tubes 40 by the metal fluid vapor.

A transfer device, such as wire or the like, to transfer electricity is connected between the BASE tubes 40. The transfer device is connected to an external electric load 70 so that the AMTEC 100 supplies power.

The principle of the BASE tube 40 is that only sodium ions vaporized by heating are allowed to pass through the BASE, and free electrons passes through the electric load 70 from the positive pole and return to the negative pole to re-combine with the ions coming from the surface of the BASE of a low pressure region. As the principle of the BASE tube 40 is applied as the core technology in the AMTEC, various programs have been rapidly disclosed to develop the operation principles, designs and technologies related to the AMTEC since the mid-1960s. In 1968, Kummer and Weber performed the thermal to electric conversion through sodium, using the beta alumina solid electrolyte patent assigned to Ford Motor.

Since the BASE tube 40 according to the present invention has the similar constitution, structure and principle to those described above, no detailed description of the BASE tube 40 will be presented herein.

The condenser 50 is positioned on the top inside the case 10. The condenser 50 collects the metal fluid vapor, the temperature of which decreases to a predetermined temperature while passing through the BASE tubes 40, and condenses the metal fluid vapor.

The condenser 50 comprises a condenser wick 51 in a net/mesh shape to collect and condense the metal fluid vapor. That is, the metal fluid vapor is collected by the condenser wick 51, to be condensed into the metal fluid. Then, a number of condensing heat pipes 60 are inserted inside the condenser 50, to improve the effect of condensation.

A number of pins 61 are installed around a part of the condensing heat pipe 60 which is protruded outside the case 10. Each of the pins 61 is attached to be perpendicular to the condensing heat pipe 60, by welding or other methods.

The condenser wick 51 is installed on the top inside the case 10 in the manner that the middle part of the condenser wick 51 is formed to be inclined downwardly. That is, the condenser wick 51 is formed in the shape of "V" from the sectional view, to collect the condensed fluid into one place.

The condenser wick 51 and the condenser circulation wick 20 are connected to each other, to transfer the metal fluid collected in the condenser wick 51 to the inside of the condenser circulation wick 20.

Figure 5:
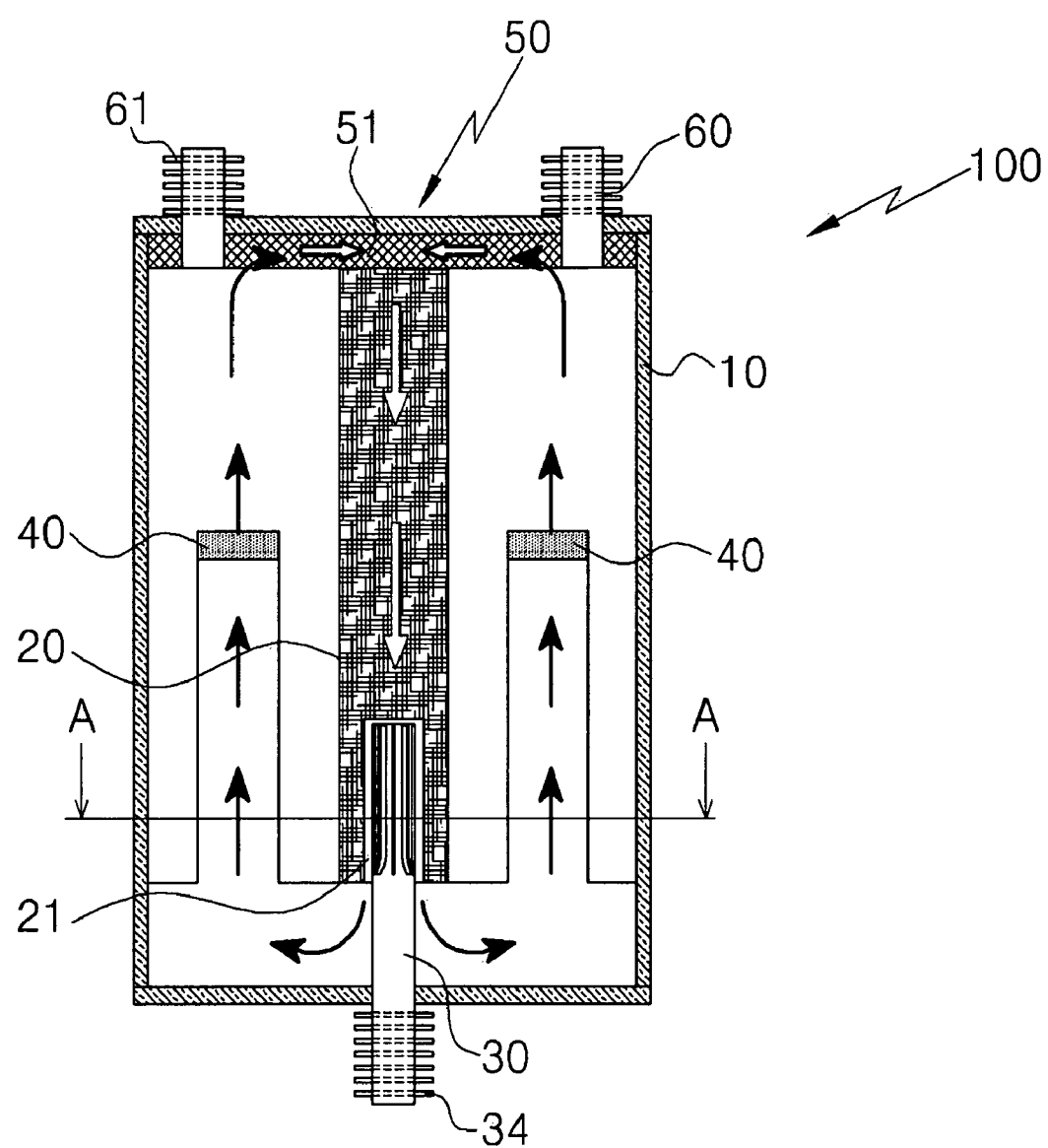
FIG. 5 is a sectional view of an AMTEC according to a second embodiment of the present invention.
Figure 6:
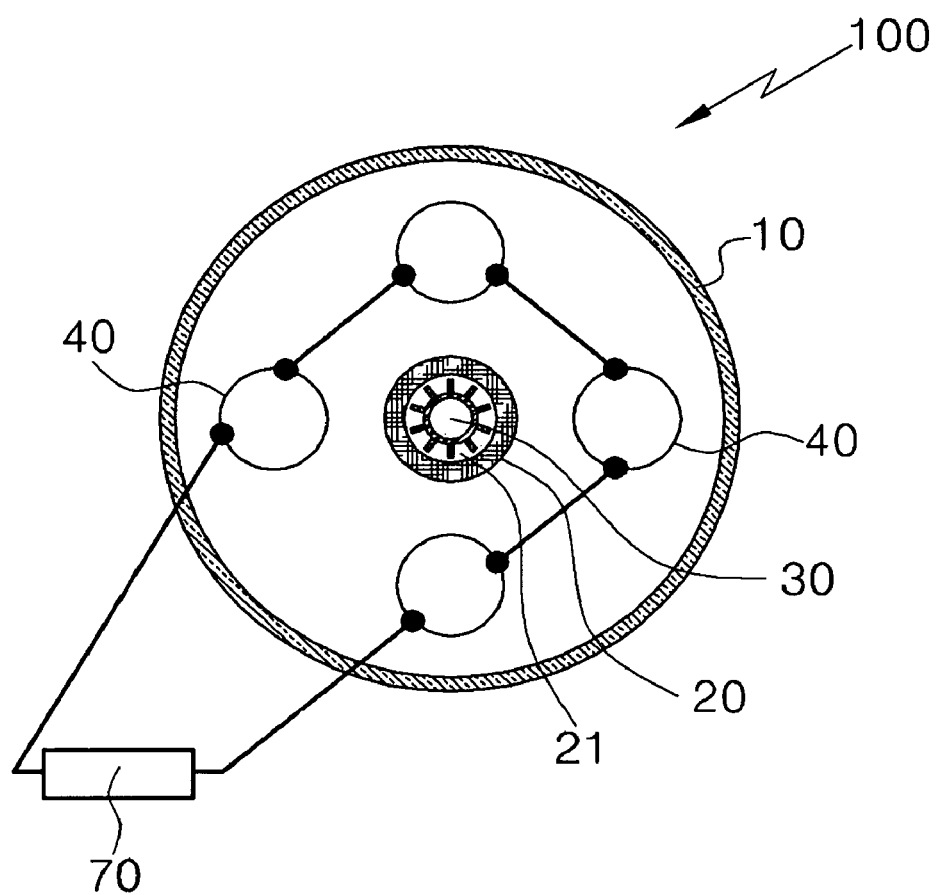
FIG. 6 is a sectional view taken along line A-A of FIG. 5.
Figure 7:
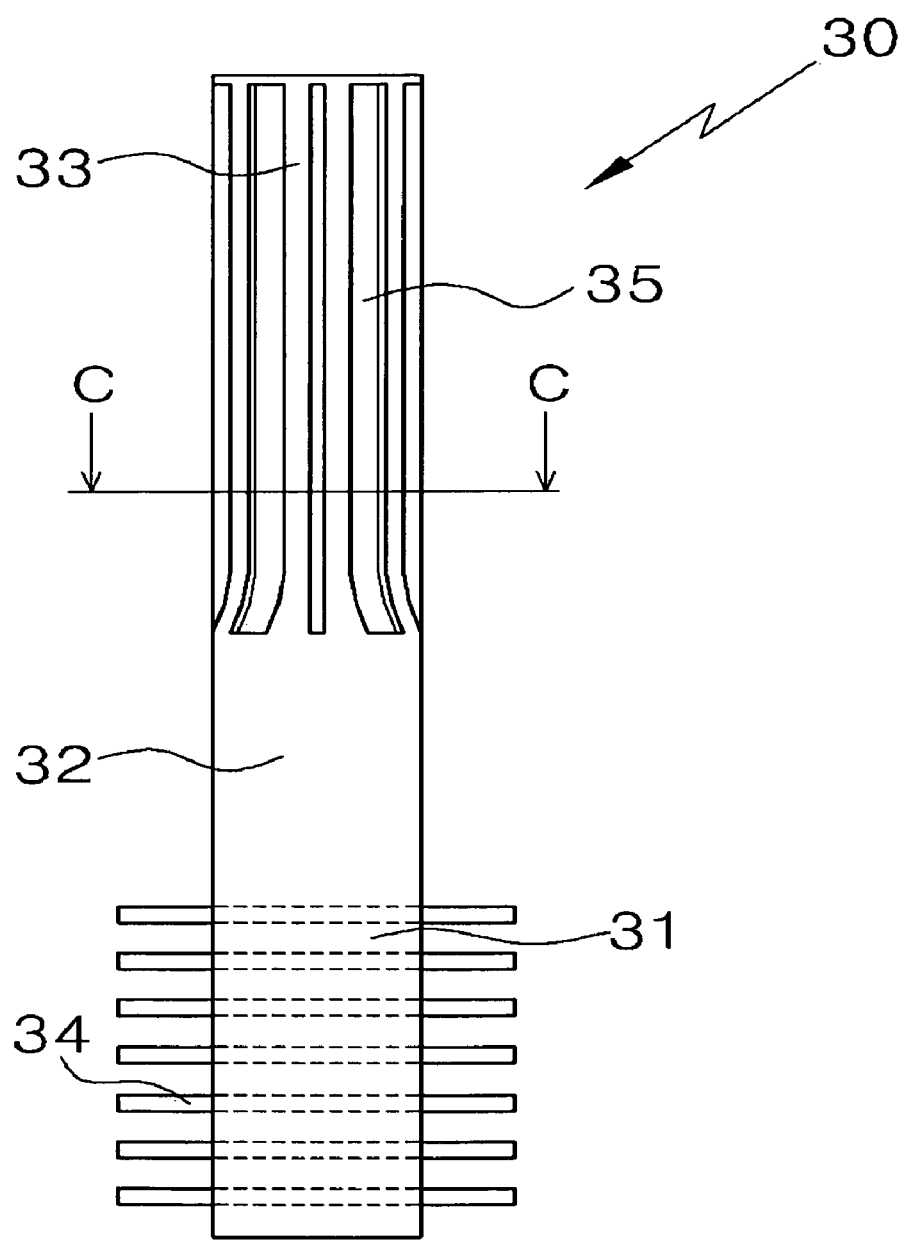
FIG. 7 is a sectional view of a heating heat pipe according to the second embodiment.
Figure 8:
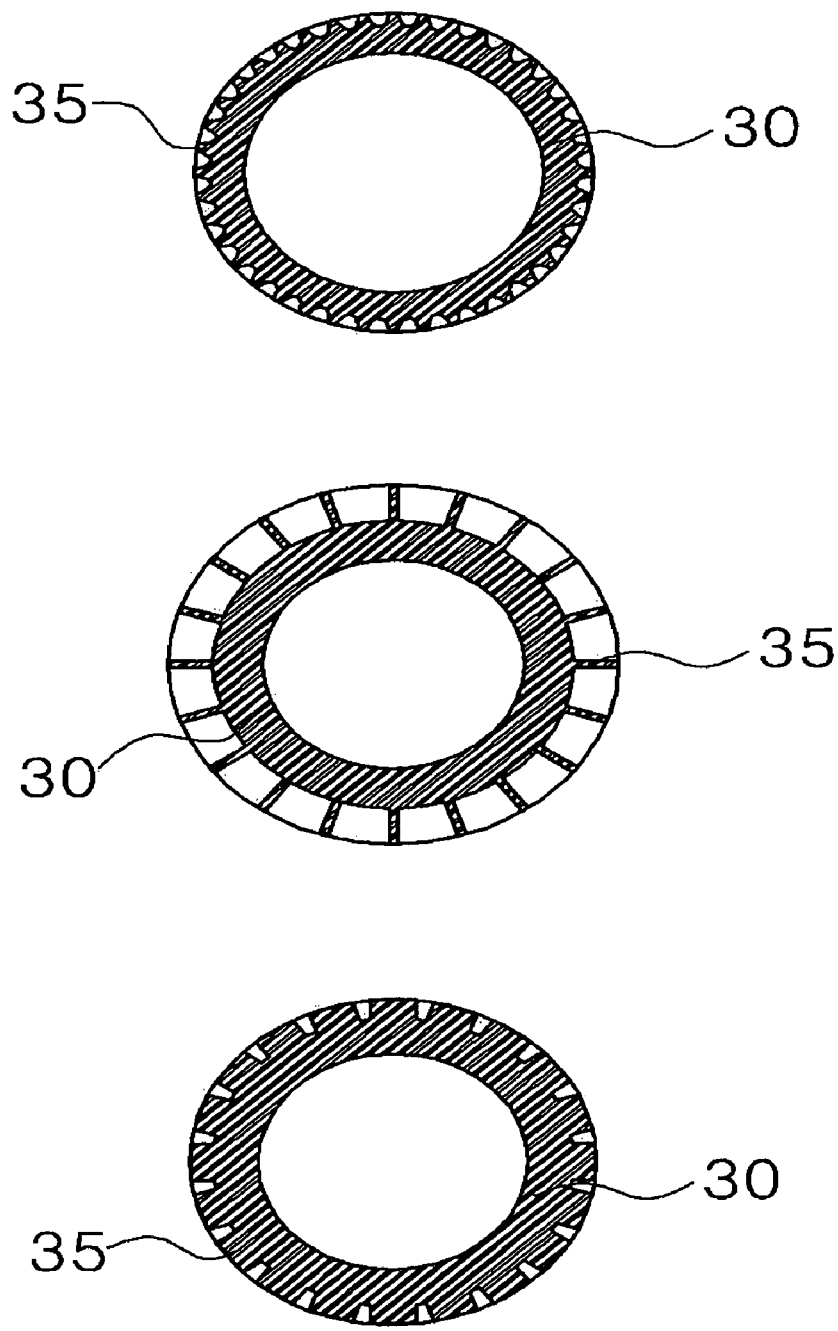
FIG. 8 is a sectional view taken along line C-C of FIG. 7.

FIG. 5 is a sectional view of an AMTEC according to a second embodiment of the present invention, FIG. 6 is a sectional view taken along line A-A of FIG. 5, FIG. 7 is a sectional view of a heating heat pipe according to the second embodiment of the present invention, and FIG. 8 is a sectional view taken along line C-C of FIG. 7.

As illustrated in FIGS. 5 and 6, the AMTEC with a heat pipe according to the present invention comprises: a case 10, a condenser circulation wick 20, a heating heat pipe 30, a condenser 50, a BASE tube 40, a condensing heat pipe 60, and an electric load 70. Since the constitution, structure and reference number of each of the case 10, condenser 50, BASE tube 40 and condensing heat pipe 60 in the second embodiment are same as those in the first embodiment, no further description thereof will be presented.

In the second embodiment, there are no groove wicks 22 around the inner circumferential surface of the condenser circulation wick 20. Groove wicks 35 for the heating heat pipe 30 are positioned around the outer circumference of the heating heat pipe 30, to guide the metal fluid vapor in one direction.

The heating heat pipe 30 comprises: a vaporization part 31 where an operating fluid filled inside is being vaporized by heat applied from outside, a transfer part 32 where the vapor of the operating fluid vaporized in the vaporization part is being transferred, and a condensation part 33 where the operating fluid vapor transferred through the transfer part 32 is being condensed by transferring heat to the outside. The inside of the heating heat pipe 30 is closed, the condensation part 33 of the heating heat pipe 30 is positioned inside the condenser circulation wick 20 installed inside the case 10, and the vaporization part 31 is positioned outside the case 10.

A number of pins 34 are formed passing through the vaporization part 31 so that heat from outside is rapidly and smoothly transferred to the inside of the heating heat pipe 30. Each pin 34 is formed to be perpendicular to the heating heat pipe 30 so that the inside of the vaporization part 31 is connected to the outside. Here, the pins 34 are attached to the vaporization part 31 of the heating heat pipe 30 by welding or other methods.

Referring to FIG. 7, a number of groove wicks 35 on heat pipe 30 are positioned at the outer circumference of the condensation part 33, so that the inside heat of the heating heat pipe 30 is evenly and smoothly transferred to the inside of the case 10 and the metal fluid vapor is guided in one direction.

Each of the groove wicks 35 on heat pipe 30 is formed to be extended along in a length direction of the heating heat pipe 30 at a predetermined interval. The groove wicks 35 on heat pipe 30 are arranged along an outer circumferential direction of the heating heat pipe 30, spaced apart by the predetermine interval.

Referring to FIG. 8, the groove wicks 35 for the heat pipe may have a sectional view of the groove wicks 35 selected among various shapes, such as a square shape, a round shape and a triangle shape.

As described with reference to the first and second embodiments of the present invention, in the AMTEC 100, the metal fluid is heated by the heating heat pipe 30 and is vaporized in the case 10 which inside is closed. The vaporized metal fluid vapor generates electricity by converting heat energy into electric energy while passing through the BASE tubes 40, and the metal fluid vapor is condensed by the condensing heat pipe 60 inside the condenser 50 and circulated back to the vaporizer 20 through the condenser circulation wick 20.

As described above, in the AMTEC with the heat pipe according to the present invention, the metal fluid is heated and cooled by the latent heat of the heating heat pipe, instead of the heat conduction according to the conventional art. Therefore, the difference between the temperature of the heat source and the temperature needed for vaporizing the metal fluid becomes small and the size of the condenser becomes small, so that thermal energy is converted into electric energy even by the heat source of low temperature in high efficiency.

Furthermore, the heat pipe is installed in the AMTEC to heat and condense the metal fluid. Therefore, heat is directly transferred to the vaporizer for vaporizing the metal fluid inside the AMTEC, so that the speed of heat transfer is fast and the AMTEC has high performance and becomes small in size.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A heat pipe heating AMTEC, which converts heat energy to electric energy, comprising:
    a case which comprises an inside that is closed and filled with a predetermined amount of a metal fluid;
    a heating heat pipe formed at a lower end of the case so as to be operatively connected with the case, for heating the metal fluid in the inside of the case and vaporizing the metal fluid into vapor;
    a condenser circulation wick installed above the heating heat pipe that protrudes in the inside of the case, for collecting the metal fluid vapor vaporized by the heating heat pipe and guiding the metal fluid vapor in one direction;
    a number of BASE (beta alumina solid electrolyte) tubes installed radially around the center of the case, for allowing the heated metal fluid vapor guided by the condenser circulation wick to pass and generate electricity; and
    a condenser formed at a top of the inside of the case, for collecting and condensing the metal fluid vapor passed through the BASE tubes;
    wherein the condenser circulation wick connected to the condenser comprises:
    an insertion opening with at least a portion of the heating heat pipe being positioned therein inside of the condenser circulation wick; and
    a number of groove wicks formed in a circumferential direction of the insertion opening, for guiding the metal fluid vapor vaporized by the heating heat pipe in one direction; and
    wherein the heating heat pipe comprises:
    a vaporization part for vaporizing an operating fluid inside of the heating heat pipe by heat applied from outside of the heating heat pipe, the vaporization part comprising a number of pins formed to pass through the vaporization part and to be perpendicular to the heating heat pipe, so that the outside heat is transferred to the inside of the heating heat pipe;
    a transfer part for transferring the operating fluid vapor vaporized in the vaporization part; and
    a condensation part for condensing the operating fluid vapor transferred through the transfer part by transferring heat to the outside of the heating heat pipe, the condensation part being positioned inside the insertion opening of the condenser circulation wick, the condensation part comprising a number of groove wicks on the heat pipe formed in a circumferential direction of the condensation part, so that the inside heat of the heating heat pipe is transferred to the inside of the case and the metal fluid vapor is guided in one direction.

2. The heat pipe heating AMTEC of claim 1, wherein the condenser comprises a condenser wick formed in a net/mesh shape, to collect and condense the metal fluid vapor.

3. The heat pipe heating AMTEC of claim 2, wherein the condenser comprises a number of condensing heat pipes positioned to protrude from the inside of the condenser to the outside of the case.

4. The heat pipe heating AMTEC of claim 3, wherein the condensing heat pipes comprise a number of pins positioned at a part of the condensing heat pipe that protrudes outside the case.

* * * * *